July 12, 1949.

N. STEVENS 2,475,714

REPAIR DEVICE FOR INNER TIRE TUBES
AND OTHER PLIABLE ARTICLES

Filed Aug. 9, 1945

Inventor
Nichols Stevens
By: Charles O. Shurvell Atty.

Patented July 12, 1949

2,475,714

UNITED STATES PATENT OFFICE 2,475,714

REPAIR DEVICE FOR INNER TIRE TUBES AND OTHER PLIABLE ARTICLES

Nichols Stevens, Chicago, Ill.

Application August 9, 1945, Serial No. 609,738

1 Claim. (Cl. 152—369)

This invention relates to a repair device for inner tubes and other pliable articles and its principal object is to provide a repair device capable of being quickly and easily applied to a punctured or cut inner tube or other pliable article.

Another object is to provide a repair device which when applied, positively prevents breakage through the puncture or cut.

Another object is to provide a repair device of simple, substantial and relatively inexpensive character.

With these and other objects and advantages in view, this invention consists in the several novel features hereinafter fully set forth and more particularly defined in the claim.

The invention is clearly illustrated in the drawing accompanying this specification, in which.

Figure 1:
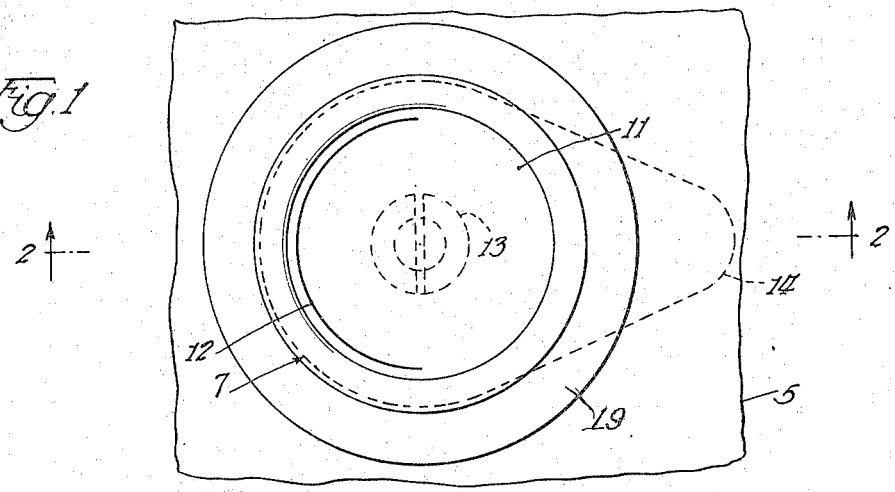
Fig. 1 is a plan of a repair device embodying a simple form of the present invention, showing the same applied to a fragment of an inner tire tube.
Figure 2:
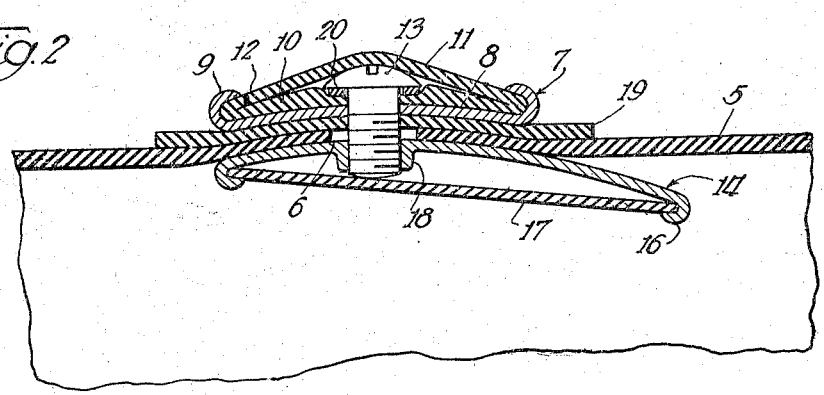
Fig. 2 is a vertical longitudinal section thereof taken on the line 2—2 of Fig. 1.
Figure 3:
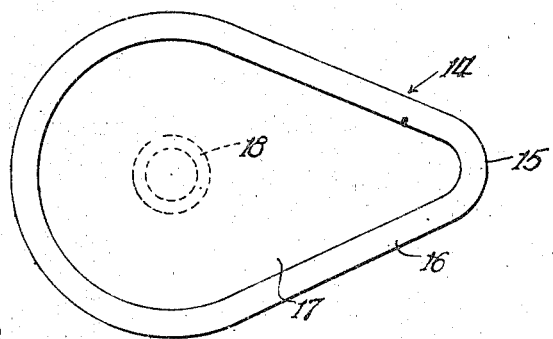
Fig. 3 is an under plan of one of the composite washers forming a part of the repair device.

Figures 1 to 3 of the drawing show the repair device upon an enlarged scale.

Referring to said drawing, the reference character 5 designates a fragment of an inner tire tube having a cut or puncture 6 therein, which is sealed by a repair device embodying a simple form of the present invention.

On the outer face of the tube is a composite washer 7 composed of a metal disc 8 formed with its edge portion curled over the body portion to provide an inturned lip 9.

Seated in the groove, formed between the body and lip of the disc, is a rubber or rubber-like disc 10, and formed as a part of, or separate from the disc 10, is a rubber or rubber-like flap 11, also secured part way along its edge between the lip 9 and washer 10. The edge 12 of the flap is free whereby the flap may be raised to obtain access to a clamp screw 13. The disc 7 and washer 10 are centrally apertured to receive the screw. A metal washer 20 is placed under the head of the screw 13.

On the inner face of the tube is an inner composite washer comprising a metal washer 14 having a blunt pointed end 15 whereby the inner washer may be thrust through the cut or puncture in the tube. The rim of the inner washer is also curled under the body to provide a lip 16 and in the groove between the body of the inner washer and the lip is secured the edge portion of a rubber or rubber-like washer 17. The edge of the washer 17 is tightly gripped between the body of the inner washer and lip.

A hole is punched in the inner metal washer 14 and the metal around the hole is extruded as at 18 and is internally threaded to receive the threads of the screw 13. The rubber washer 17 prevents air from leaking out between the threads of the screw and extruded part 18.

Desirably, but not necessarily, a flexible, pliable washer 19 is interposed between the metal disc 7 and the outer face of the tube, which washer is formed with an aperture through which the screw extends.

To apply the repair device to a cut or punctured inner tube, the inner composite washer is thrust through the cut or puncture by inserting the pointed end first, and is then placed against the inner face of the tube with the hole in register with the cut or puncture, using the pointed end of the inner washer as a handle. The tube with the inner composite washer therein may then be laid flat on the ground or other object, the flexible washer 19 is placed upon the outer face of the tube with its hole in register with the hole in the inner washer. The composite disc 7 is then placed on the flexible washer 19 with the holes in register with the other holes; the flap 11 is then turned back and the screw inserted through the holes and screwed up tight in the inner metal washer, thereby clamping the cut or punctured tube between the outer disc and inner washer.

The rubber washer 17 prevents air from leaking out between the threads of the screw and inner metal washer. When the tube is inflated, the rubber washer 17 is pressed against the inner face of the metal inner washer and the screw. Said washer 17 protects the inner tube against injury by the screw 13 in case the tire becomes deflated. The rubber flap 11 protects the tire casing against any abrasion by the head of the screw.

Figure 4:
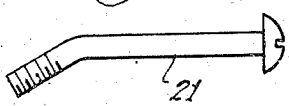
Fig. 4 is a side elevation of a tool used in connection with the device.

To facilitate assembling the device on an inner tube, a tool such as a screw 21 (see Fig. 4) may be used. This screw is screwed into the screw hole in the metal inner washer before inserting it into the tube. The screw 21 then serves as a handle for the inner washer until the user locates the same with respect to the puncture. The screw is then withdrawn and the parts assembled as above explained.

The repair device may be installed in all kinds of weather—rain or snow. Furthermore, oil or grease on the tube will not interfere with the installation of the repair device.

The repair device may be made in various sizes and the outer disc and inner metal washer may be made from materials other than metal—for instance certain plastics may be used.

Preferably the outer metal disc and inner metal washer are bowed or crowned as shown to present smooth surfaces to the tube.

What I claim as new and desire to secure by Letters Patent is:

A repair device comprising a metal outer disc having a lip overlying the body portion of the disc, a rubber washer with its marginal portion held between the lip and disc, said rubber washer being formed with a rubber flap with a portion of its marginal edge held between the lip and body of the disc, an inner rigid, pointed, dished metal washer having a marginal lip underlying the body portion of the washer, a rubber washer with its marginal edge gripped between the lip and body of the inner washer, said metal disc and metal washer having registering holes and the inner metal washer being screw threaded around the hole therein, and a screw extending through said holes and threaded in the threads around the hole in the inner metal washer.

NICHOLS STEVENS.

REFERENCES CITED

The following references are of record in the file of this patent:

UNITED STATES PATENTS

| Number | Name | Date |
|---|---|---|
| 776,697 | Seiverling | Dec. 6, 1904 |
| 1,064,643 | DeLancey | June 10, 1913 |
| 1,221,912 | Sampson | Apr. 10, 1917 |

FOREIGN PATENTS

| Number | Country | Date |
|---|---|---|
| 3,145 | Great Britain | 1912 |
| 6,406 | Great Britain | 1912 |